May 29, 1923.
W. J. FRASER
PROTECTIVE TREAD FOR PNEUMATIC TIRES
Filed April 19, 1921
1,456,729
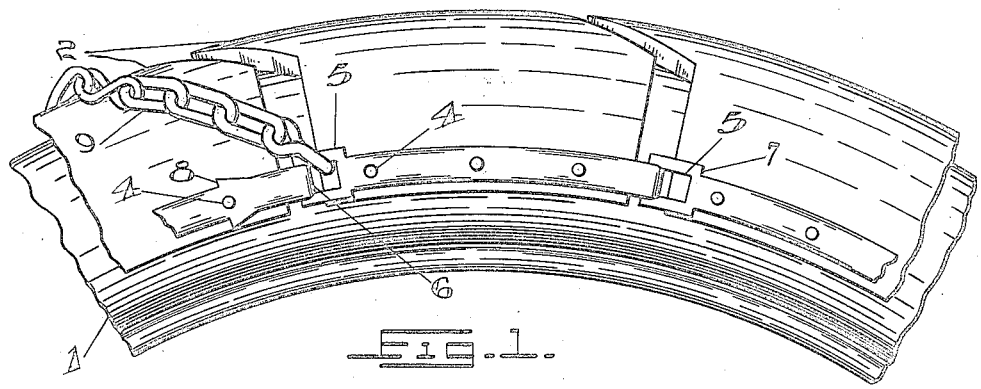
FIG. 1.
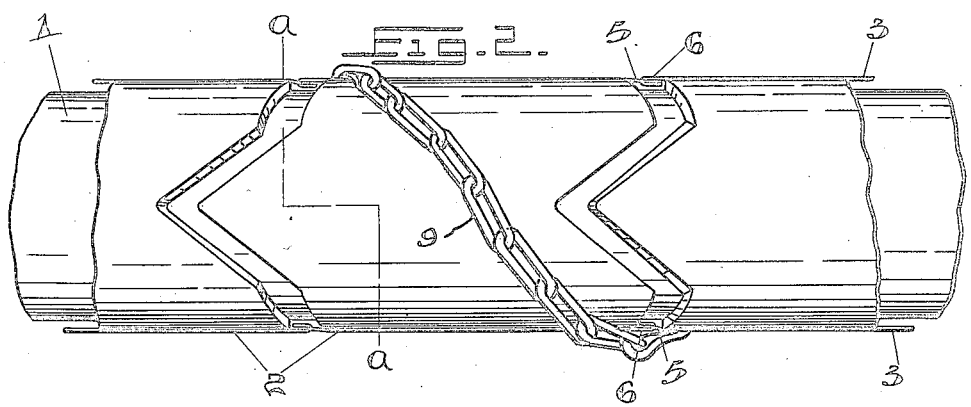
FIG. 2.
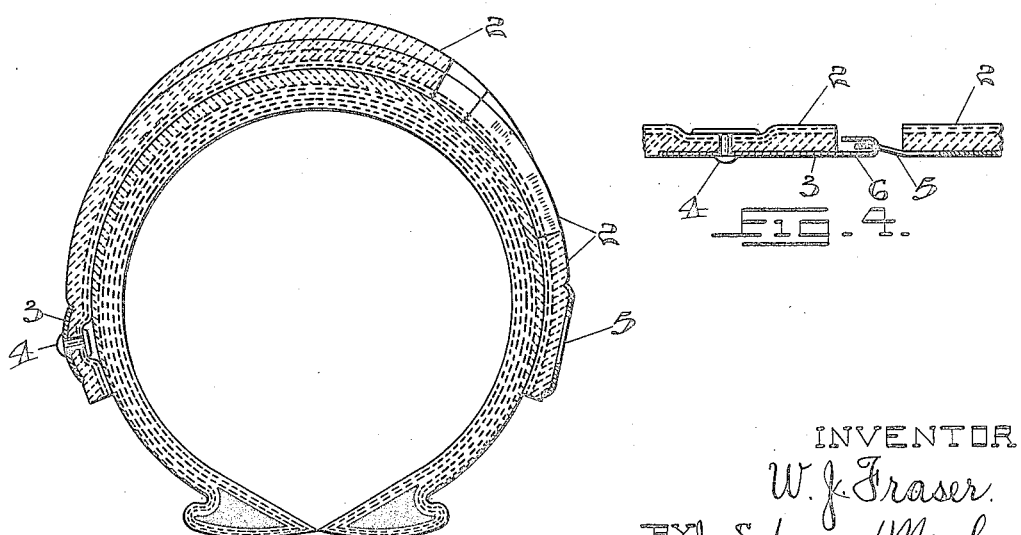
FIG. 3.
FIG. 4.
INVENTOR
W. J. Fraser.
BY J. Edward Maybee.
ATTY.

Patented May 29, 1923.

1,456,729

UNITED STATES PATENT OFFICE.

WILLIAM J. FRASER, OF TORONTO, ONTARIO, CANADA.

PROTECTIVE TREAD FOR PNEUMATIC TIRES.

Application filed April 19, 1921. Serial No. 462,693.

*To all whom it may concern:*

Be it known that I, WILLIAM J. FRASER, of the city of Toronto, in the county of York, Province of Ontario, Canada, a subject of the King of Great Britain, have invented certain new and useful Improvements in Protective Treads for Pneumatic Tires, of which the following is a specification.

This invention relates to means for utilizing tread sections formed of old tire casings as a protection for the tread surfaces of pneumatic tires and as a substitute for or in connection with anti-skid tire chains, and my object is to so arrange the tread sections and the metallic connections therefor that all parts of the latter and their fastenings are held entirely out of contact with the tire, to provide connections which are strong, simple and cheap and not liable to damage by curbstones and the like; and to so construct the connections that anti-skid chains may be secured in position thereby, and to so arrange the protective tread that it will not affect smooth running.

I attain my object by means of the constructions hereinafter described and illustrated in the accompanying drawings in which—

Fig. 1 is a side elevation of part of a pneumatic tire provided with my protective tread;

Fig. 2 a plan view of the same;

Fig. 3 a cross section on an enlarged scale; and

Fig. 4 a longitudinal section through one of the joints.

In the drawings like numerals of reference indicate corresponding parts in the different figures.

1 is a pneumatic tire of an ordinary form. To this tire I apply a protective tread formed of a plurality of flexible tread sections 2, preferably formed of old tire casings. These sections being somewhat spaced, a tire casing of the same size as the pneumatic tire itself will usually suffice to form the protective tread. These tread sections are secured together by metallic connections as hereinafter described.

In order to prevent as far as possible the vibration which is liable to occur owing to the tread surface on which the wheel runs not being continuous, I prefer to convexly extend the tread portion at one end of each section and to similarly recess the opposite end of the section. The tread sections thus in effect overlap as will be seen on consideration of Figs. 1 and 2, so that the transition from one section to another is gradual and smooth running is attained. Preferably the extensions and depressions are angular as shown.

The metallic connections are so arranged and connected that no metallic part will contact with the surface of the pneumatic tire underneath. With this idea in view, the metallic connections lie entirely upon the outside of each tread section at each side, and are held out of contact with the pneumatic tire by means of said sections, the connections at each side being flexibly joined in series, and held spaced from the surface of the tire by the said sections.

In the preferred arrangement a metallic connector 3 is secured to the outer surface of each side of each tread section by means of rivets 4, each connector having an integral eye 5 formed in one end and an integral hook 6 at the other end adapted for engagement with the hooks and eyes of adjacent tread sections. These hooks and eyes are stamped out and bent up from a flat metal strap and space is provided between the jaws of the hooks and in the eyes to permit of each hook rocking relative to the eye in directions normal to and also parallel to the faces of the connectors.

It will be noted on reference to Fig. 4 that the hooks are inwardly turned with their ends in close proximity to the ends of the tread sections, whereby said ends serve as guards to prevent accidental disengagement of the hooks from the eyes, the nearest rivet securing the metallic connector in place being spaced sufficiently far from the ends of the sections to permit the latter to be sprung back when the hooks and eyes are to be engaged and disengaged.

As it is sometimes necessary to engage a tool with the connectors to draw them to position and enable them to be hooked together, I provide one or more shoulders on the connectors for this purpose. At one end a shoulder or shoulders 7 are readily formed as the eye is made of greater width than the body of the connector to enable its sides to be given a cross sectional area proportionate to that of the body of the connector at the points where the rivets are located. Adjacent the other end such shoulders are readily formed by forming a projection 8 at one or both edges of the connector.

It will be observed particularly on reference to Fig. 4 that the connectors are made of comparatively thin flat metal, and the hooks and eyes are proportioned so that they will be held out of contact with the surface of the pneumatic tire by the thickness of the tread sections upon which they are secured. It is desirable also that the heads of the rivets 4 shall be held from contact with the surface of the pneumatic tire. These rivet heads tend to embed themselves slightly in the flexible tread sections, but this effect can be much accentuated by forming depressions in the connectors into which the substance of the tread sections is drawn when the rivets are set up. Preferably a single continuous depression is formed by concaving the body of the connector transversely from end to end as indicated in Fig. 3.

It will be noted that I impart to the outer edges of the eyes 6 a sharp inward bend as shown particularly in Fig. 3, and when the projections 8 are employed, the outer projections will also be given an inward inclination.

The great value of this concaving of the connectors and inward bending of the parts of the eyes and the projections 8 is that the whole connection lies snug to the sections of the protective tread and is not therefore so liable to damage by contact with curbstones or other obstructions as would otherwise be the case. Incidentally the appearance is thereby much enhanced.

While the protective tread cut as shown has very great anti-skid value, under certain conditions chains may be necessary, and I therefore provide short chain sections 9 which extend diagonally from one connection at one side to another connection at the opposite side spaced circumferentially from the first mentioned connection. By connecting each chain to a forward connection in the inside of the wheel and to a rearward connection on the outside of the wheel, it will be seen, an incipient side-skid is opposed by the chain at right angles to the direction of skid and is thereby constantly checked. Suitable split links may be provided whereby these chain sections may be directly connected into the eyes 5.

What I claim as my invention is:—

1. A tire protector comprising a plurality of flexible non-metallic tread sections, each adapted to extend across the tread of a pneumatic tire and partway down the sides thereof, and a metallic connector secured to the outer surface of each side of each tread section and held out of contact with the pneumatic tire by the interposed sides of said section, the connections at each side being flexibly joined in series, the engaging parts of said connections also being held out of contact with the surface of the tire by the sides of said sections.

2. A tire protector comprising a plurality of flexible non-metallic tread sections, each adapted to extend across the tread of a pneumatic tire and partway down the sides thereof, and a metallic connector secured to the outer surface of each side of each tread section and held out of contact with the pneumatic tire by the sides of said section, each connector having an integral eye formed at one end and an integral hook at the other adapted for engagement directly with the hooks and eyes of adjacent tread sections.

3. A tire protector constructed as set forth in claim 2 in which each connector is formed of a flat metal strap and the hooks and eyes respectively are stamped out and bent up from the flat material, space being provided between the jaws of the hooks and in the eyes to permit of each hook rocking relative to the eye in directions normal to and also parallel to the faces of the connectors.

4. A tire protector constructed as set forth in claim 2 in which the hooks are inwardly turned with their ends in close proximity to the ends of the tread sections, whereby said ends serve as guards to prevent accidental disengagement of the hooks from the eyes, the fastenings of the connectors being spaced sufficiently far from the ends of the sections to permit the latter to be sprung back when the hooks and eyes are to be engaged and disengaged.

5. A tire protector constructed as set forth in claim 2 in which each connector is formed with a circumferentially directed shoulder adjacent one end for engagement with a tool.

6. A tire protector comprising a plurality of flexible non-metallic tread sections, each adapted to extend across the tread of a pneumatic tire and partway down the sides thereof, and connectors at each side flexibly securing the sections together in spaced relationship, the tread portion of one end of each section being convexly extended circumferentially of the tire and the opposite end similarly recessed to receive the convex end of an adjoining tread section.

7. A tire protector constructed as set forth in claim 1 provided with a series of sections of chain extending diagonally from one connection at one side to a connection on the other side spaced circumferentially from the first mentioned connection.

8. A tire protector constructed as set forth in claim 2 provided with a series of sections of chain extending diagonally from one eye at one side to an eye on the other side spaced circumferentially from the first mentioned eye.

9. A tire protector constructed as set forth in claim 2 in which each connector is formed of a flat metal strap and the hooks and eyes respectively are stamped out and bent up from the flat material, space being provided between the jaws of the hooks and in the eyes to permit of each hook rocking relative to the eye in directions normal to and also parallel to the faces of the connectors, the metal of each eye at the side nearest the tire tread being bent inwardly toward the tire.

10. A tire protector comprising a plurality of flexible non-metallic tread sections, each adapted to extend across the tread of a pneumatic tire and partway down the sides thereof, and a metallic connector secured to the outer surface of each side of each tread section, the connections at each side being flexibly joined in series, and a series of sections of chain extending diagonally from one connection at one side to a connection at the other side spaced circumferentially from the first mentioned connector.

Signed at Toronto, Can., this 7th day of April, 1921.

WILLIAM J. FRASER.